United States Patent
Chua et al.

(10) Patent No.: US 9,134,172 B2
(45) Date of Patent: Sep. 15, 2015

(54) AMBIENT LIGHT SENSING METHOD AND AN AMBIENT LIGHT SENSING DEVICE

(71) Applicant: LITE-ON SINGAPORE PTE. LTD., Midview (SG)

(72) Inventors: Seng-Yee Chua, Singapore (SG); Mon-Oo Win, Singapore (SG); Tong-Tee Tan, Singapore (SG)

(73) Assignee: LITE-ON SINGAPORE PTE. LTD., Midview (SG)

( * ) Notice: Subject to any disclaimer, the term of this patent is extended or adjusted under 35 U.S.C. 154(b) by 259 days.

(21) Appl. No.: 13/789,745

(22) Filed: Mar. 8, 2013

(65) Prior Publication Data

US 2014/0252211 A1    Sep. 11, 2014

(51) Int. Cl.
*G02B 19/00* (2006.01)
*G01J 1/42* (2006.01)

(52) U.S. Cl.
CPC ............ *G01J 1/4204* (2013.01); *G02B 19/009* (2013.01); *G02B 19/0038* (2013.01); *G02B 19/0095* (2013.01)

(58) Field of Classification Search
CPC combination set(s) only.
See application file for complete search history.

(56) References Cited

U.S. PATENT DOCUMENTS

2013/0314520 A1* 11/2013 Ishihara .......................... 348/68

FOREIGN PATENT DOCUMENTS

WO    WO 2012/114934 A1 *  8/2012  ............... A61B 1/00

* cited by examiner

*Primary Examiner* — Francis M Legasse, Jr.
(74) *Attorney, Agent, or Firm* — Li & Cai Intellectual Property (USA) Office (57) ABSTRACT

An ambient light sensing method is provided. The ambient light sensing method comprises: acquiring the sensitivity settings, an exposure time and obtaining a sensing signal of a light sensor according to the sensitivity settings and the exposure time; determining whether the magnitude of the sensing signal is within a predetermined range when the sensing signal is available, wherein the predetermined range has an upper value and a lower value; updating the sensitivity settings and the exposure time of the light sensor according to the determined result for the magnitude of the sensing signal; and acquiring the sensing signal of the light sensor with the updated sensitivity settings and the updated exposure time.

15 Claims, 9 Drawing Sheets

AMBIENT LIGHT SENSING METHOD AND AN AMBIENT LIGHT SENSING DEVICE

BACKGROUND OF THE INVENTION

1. Field of the Invention

The instant disclosure relates to a light sensor; in particular, to an ambient light sensor.

2. Description of Related Art

Ambient Light Sensor (ALS) provides outputs that approximate human eye response. It is very useful in display brightness management with the purpose of extending mobile battery life and providing optimum viewing experience in diverse indoor and outdoor lighting conditions.

Figure 1:
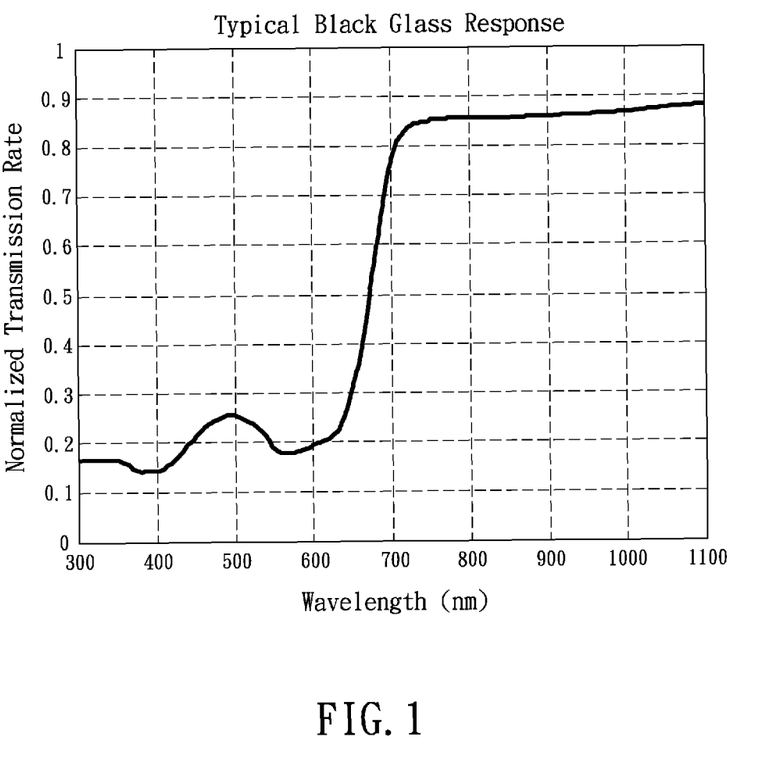
FIG. 1 shows a curve diagram of a traditional typical black glass response varying with the wavelength of light.

In mobile phone application, it is very common to use tinted or black glass to improve phones outlook. However, black glass presents a particular challenge for ambient light sensors as it distorts the spectrum of ambient light that falls on the ambient light sensor. Black glasses typically have the transmission rate as shown in FIG. 1. It has much higher transmission rate for the IR light spectrum, to which is not detectable by human eye, than the visible light spectrum.

By hiding under the black glass, the sensor would need very wide dynamic range while maintaining reasonable resolution to detect both indoor lightings (primarily fluorescent or white LED that has very low IR content) and outdoor lightings (primarily sunlight that has very high IR content).

Existing implementation to extend sensor dynamic range is described as follows. Firstly, the sensor ADC output is linear to incident light in logarithmic domain. Secondly, the sensor with higher ADC resolution should be utilized. For example, instead of 16 bit ADC, an 20 bit ADC would increase the detection dynamic range by 16×. However, the earlier implementation has degraded the sensor resolution significantly while the later solution has increased the ADC conversion time proportionally that effectively reducing the sensor conversion speed.

SUMMARY OF THE INVENTION

The object of the instant disclosure is to offer an ambient light sensor with automatic gain control which extends the dynamic range of the sensors without sacrificing sensor resolutions by intelligently switching the gain settings according to ambient light level.

In order to achieve the aforementioned objects, according to an embodiment of the instant disclosure, an ambient light sensing method is offered. The method comprising: acquiring the sensitivity settings, an exposure time and obtaining a sensing signal of a light sensor according to the sensitivity settings and the exposure time; determining whether the magnitude of the sensing signal is within a predetermined range when the sensing signal is available, wherein the predetermined range has an upper value and a lower value; updating the sensitivity settings and the exposure time of the light sensor according to the determined result for the magnitude of the sensing signal; and acquiring the sensing signal of the light sensor with the updated sensitivity settings and the updated exposure time.

In order to achieve the aforementioned objects, according to an embodiment of the instant disclosure, an ambient light sensing method is offered. The method comprising: acquiring the sensitivity settings, an exposure time and obtaining a rough sensing signal of a light sensor according to the sensitivity settings and the exposure time, wherein the rough sensing signal is acquired during a rough exposure time less than the exposure time by M times, in which M is larger than 1; determining whether the magnitude of the rough sensing signal is within a predetermined range when the rough sensing signal is available, wherein the predetermined range has an upper value and a lower value; updating the sensitivity settings and the exposure time of the light sensor when the magnitude of the rough sensing signal is not within the predetermined range; and acquiring a sensing signal of the light sensor with the updated sensitivity settings and the updated exposure time when the magnitude of the rough sensing signal is within the predetermined range.

In order to achieve the aforementioned objects, according to an embodiment of the instant disclosure, an ambient light sensing device is offered. The ambient light sensing device comprises a sensor and a controller. The sensor has sensitivity settings, generates a sensing signal when illuminated by the ambient light. The controller controls the sensor to process the aforementioned sensing method.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The ambient light sensor sensitivity can be adjusted according to incoming ambient light by assessing the current measurement if it is outside the sensor predetermined linear range, so that the sensor sensitivity can be adjusted accordingly for next light measurement. This auto gain control algorithm can be implemented built-in to the sensor chip or implemented at the controller level outside the sensor chip. With the described invention, the dynamic range of the sensor can be extended up to 1000× without sacrificing sensor resolution and conversion speed.

Figure 2A:
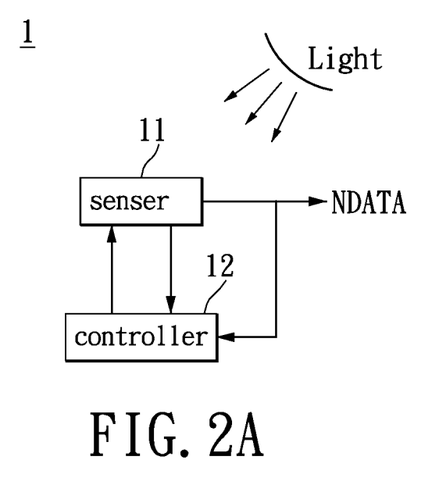
FIG. 2A shows a block diagram of an ambient light sensing device according to an embodiment of the instant disclosure.

The sensor sensitivity can be adjusted by having multiple gain settings in the chip or exposing the sensor to the incident light for multiple units of time frames or a mixture of both. FIG. 2A shows an ambient light sensing device 1 comprising a sensor 11 and a controller 12.

Figure 2B:
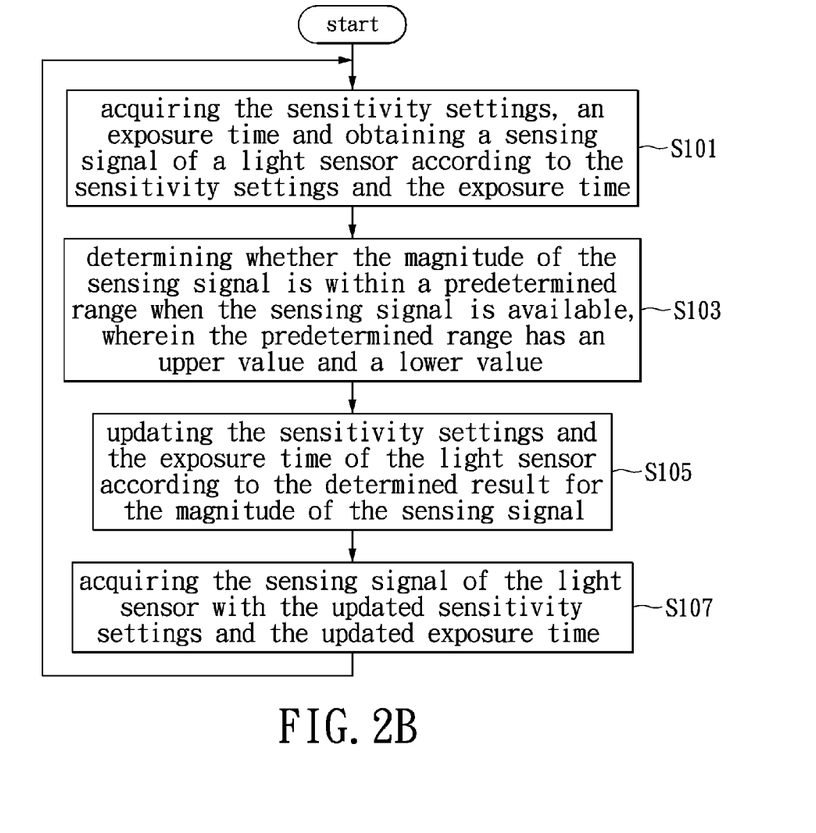
FIG. 2B shows a flow chart of an ambient light sensing method according to an embodiment of the instant disclosure.

FIG. 2B illustrates the auto gain control algorithm that can be implemented in the master controller to auto adjust the sensor sensitivity according to incoming ambient light. In step S101, acquiring the sensitivity settings, an exposure time and obtaining a sensing signal of a light sensor according to the sensitivity settings and the exposure time. The algorithm starts by reading the sensor status register, which tells the controller the sensor current sensitivity settings (referring to gain), exposure time (also called integration time) and if new data generated from the sensor is available.

Then, in step S103, determining whether the magnitude of the sensing signal is within a predetermined range when the sensing signal is available, wherein the predetermined range has an upper value and a lower value. When new sensing signal NDATA is available, the controller would read the sensing signal NDATA from the data register, and check if the sensing signal NDATA is within the predetermined linear range (NDATA_MIN<NDATA<NDATA_MAX), in which the upper value of the predetermined range is NDATA_MAX and the lower value is NDATA_MIN.

In step S105, updating the sensitivity settings and the exposure time of the light sensor according to the determined result for the magnitude of the sensing signal. When the magnitude of the sensing signal NDATA is larger than the upper value, reducing the sensitivity of the light sensor by one step (GAIN=GAIN-1; e.g. from GAIN 2 to GAIN 1 shown in FIG. 3). When the magnitude of the sensing signal NDATA is smaller than the lower value, increasing the sensitivity of the light sensor by one step (GAIN=GAIN+1; e.g. from GAIN 2 to GAIN 3 shown in FIG. 3). When the magnitude of the sensing signal NDATA is within the predetermined range (NDATA_MIN<NDATA<NDATA_MAX), maintaining the sensitivity of the light sensor. In other words, if it is within the linear range, no change of sensor sensitivity is required, and the sensor would continue next measurement with the current gain settings. If the data (NDATA) is greater than the upper value NDATA_MAX, where potentially the sensor has been saturated, sensor sensitivity would be reduced by 1 step in next measurement. Similarly, if the data (NDATA) is smaller than the lower value NDATA_MIN, where potentially the sensor did not sensitive enough to detect low ambient light and conversion might be sensitive to quantization error, sensor sensitivity would be increased by one step in next measurement. The derived new gain setting would be updated to the gain and exposure time registers respectively and the next data conversion would be based on the updated settings.

Additionally, there should be a hysteresis added to the data comparison with predefined boundary, to avoid sensor gain setting from switching to and from too frequent due to the data (NDATA) is too closed to the predefined boundary or due to the inherited gain error between the adjacent gain settings. For example, the linear determined range may be (NDATA_MIN*(1-HYS))<NDATA<(NDATA_MAX*(1+HYS)), in which HYS is the hysteresis factor. In doing so, the upper value NDATA_MAX is increased with the hysteresis term HYS*NDATA_MAX, the lower value NDATA_MIN is reduced with the hysteresis term HYS*NDATA_MIN.

Figure 3:
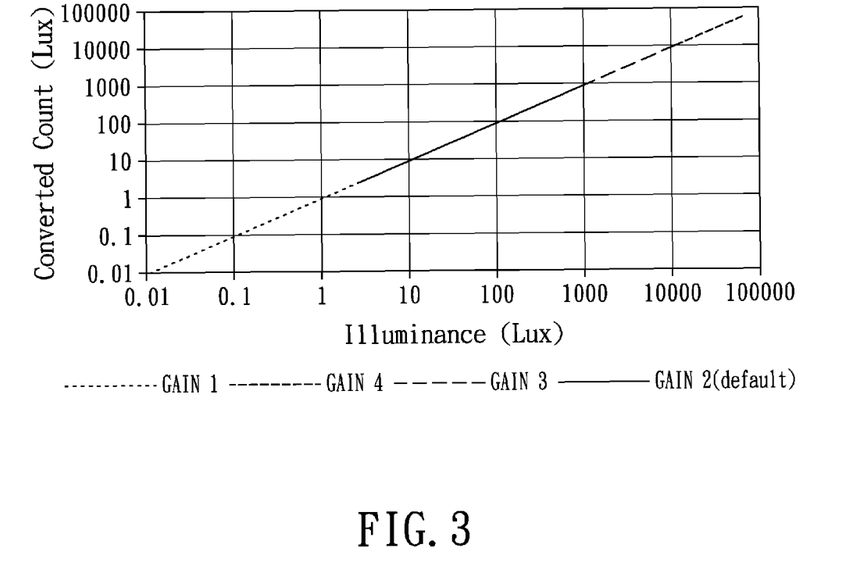
FIG. 3 shows a curve diagram of a sensor output according to an embodiment of the instant disclosure.

FIG. 3 illustrates the sensor output with respect to ambient light with the auto gain control algorithm implemented. Without auto gain control, the sensor could only detect ambient light range of not more than 3 illuminance decades (referring to GAIN 2 ranges from several counts to one thousand counts), before the sensor is saturated or its performance is affected by ADC quantization error. With the auto gain control algorithm, the sensor could detect ambient light range up to 6 illuminance decades.

Then, in step S107, acquiring the sensing signal of the light sensor with the updated sensitivity settings and the updated exposure time. After step S107, the entire auto gain control loop could start again with updated gain and exposure setting.

Figure 4:
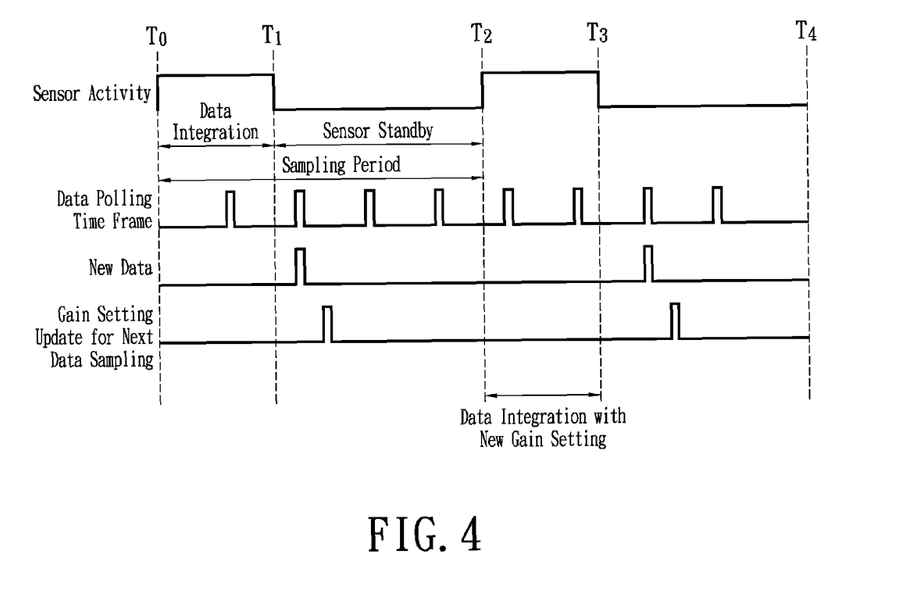
FIG. 4 shows a timing diagram when the sensor is used with sampling rate much slower than actual integration according to an embodiment of the instant disclosure.

Further, the manner of obtaining the sensing signal of the light sensor (step S101) could be implemented by periodically obtaining the sensing signal with a sampling period. The sampling period includes a data integration time and a standby time, in which the data integration time is the exposure time. FIG. 4 illustrates the timing diagram when the sensor is used with sampling rate much slower than actual data integration time. This is the typical application condition in mobile phone application, in order to reduce overall sensor power consumption. The sensor data sampling period or measuring period is defined as T2-T0, while the actual data integration time or sensor exposure time is defined as T1-T0. The sensor would be in standby or in sleep mode during T2-T1, to reduce overall sensor current consumption. The sensor wakes up again at T2 for a new data integration. If the data polling rate from the master controller is at least 2 times faster than the sensor data sampling rate, the new derived gain settings (if required) could be updated in time before the sensor begins another new data sampling cycle.

Figure 5:
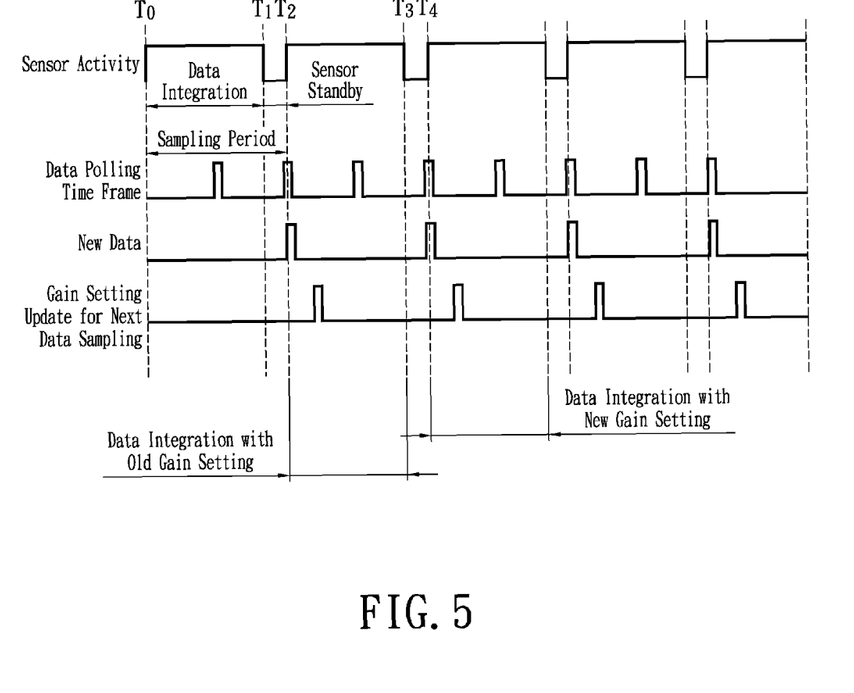
FIG. 5 shows a timing diagram when the sensor is used with sampling rate about the same as actual data integration time according to an embodiment of the instant disclosure.

FIG. 5 illustrates the timing diagram when the sensor is used with sampling rate about the same as actual data integration time. Since the data pooling rate from the master controller is compatible with the sensor data sampling rate, it has high chance that the derived gain settings are updated after the next data sampling cycle starts. Hence, there would be at least a sampling cycle delay (T4-T2) and up to 2 sampling cycle delay to report the data with updated gain settings.

To minimize the delay of reporting data with derived gain settings as mentioned above, the sensor can implemented a forced restart feature that allow user to restart the data sampling cycle with derived gain setting regardless if the sensor is in active mode or in sleep mode. In other words, for obtaining the sensing signal of the light sensor, the controller could perform a force restart procedure to re-obtaining the sensing signal at any time of the sampling period (T2-T0).

Figure 6:
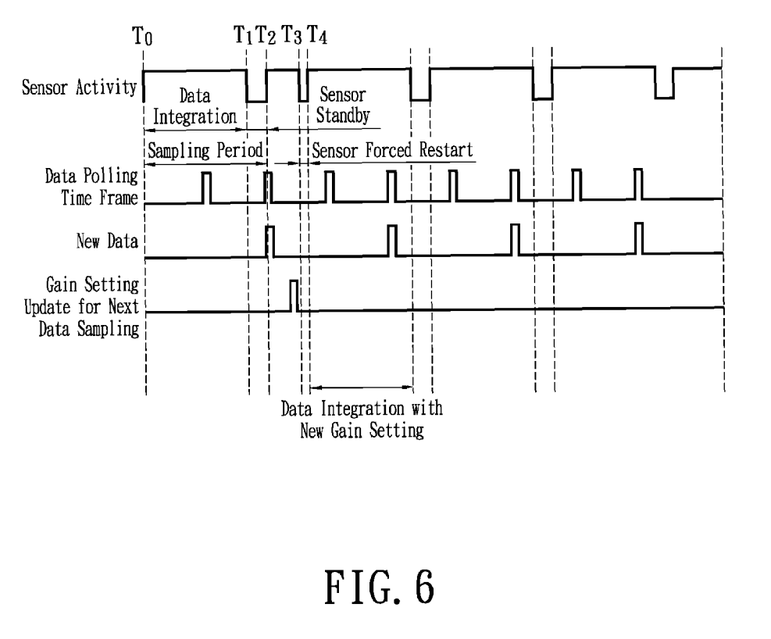
FIG. 6 shows a timing diagram with forced restart implemented in the sensor according to an embodiment of the instant disclosure.

FIG. 6 illustrates the timing diagram with forced restart implemented in the sensor. As shown in FIG. 6, a new data is read at T2, and assuming the data is outside the working boundary, the new derived gain setting will be updated at T3. The sensor could be forced to restart even if it is half way performing data integration. In this way, there is only a small delay of (T4-T2) due to register update delay and sensor forced restart delay. These delays could be negligible compare to the data sampling period.

Another embodiment of the instant disclosure includes implementing a rough data integration procedure prior to actual data integration to identify optimum gain setting for current ambient light level, before starting a complete data integration (i.e. the actual data integration). Rough data integration means to scarify sensor resolution to gain faster conversion speed. If the sensor resolution reduced by M times, the conversion speed would also be shorten by M times.

Figure 7:
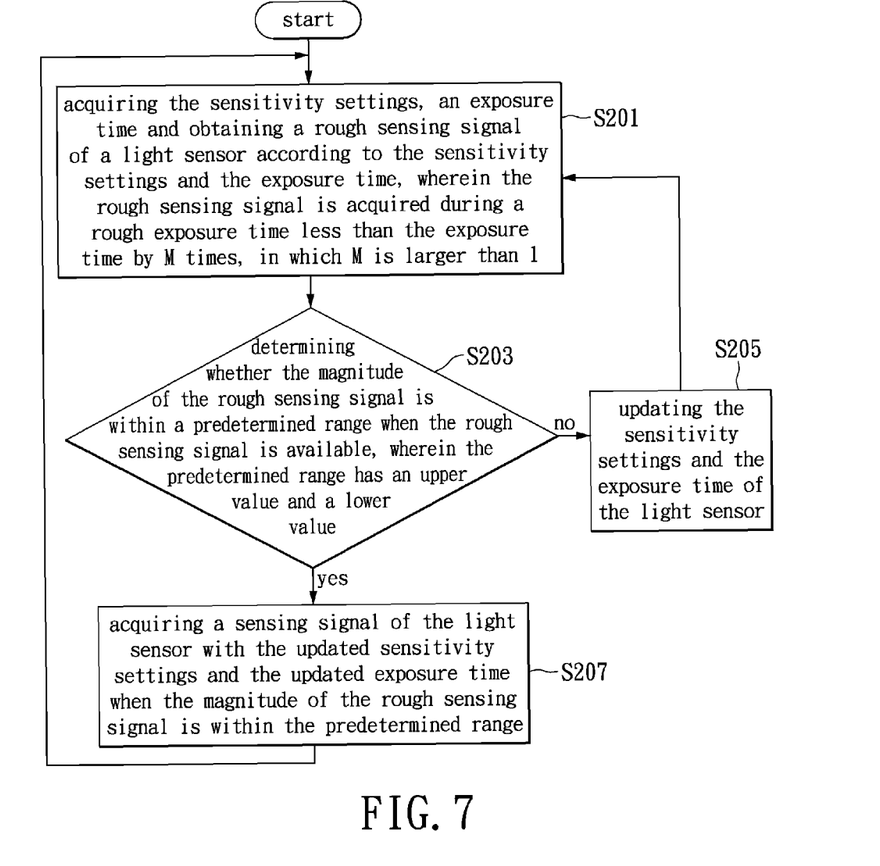
FIG. 7 shows a flow chart of an ambient light sensing method according to another embodiment of the instant disclosure.

Although the rough measurement data has resolution substantially lower than actual data, it should be enough for searching optimum gain settings. FIG. 7 illustrates the flow chart with rough data integration implemented. Firstly, in step S201, acquiring the sensitivity settings, an exposure time and obtaining a rough sensing signal of a light sensor according to the sensitivity settings and the exposure time, wherein the rough sensing signal is acquired during a rough exposure time less than the exposure time by M times, in which M is larger than 1. Then, in step S203, determining whether the magnitude of the rough sensing signal is within a predetermined range when the rough sensing signal is available, wherein the predetermined range has an upper value NDATA_MAX/M and a lower value NDATA_MINIM. The upper value NDATA_MAX/M is less than the aforementioned upper value NDATA_MAX by M times. The lower value NDATA_MIN/M is less than the aforementioned lower value NDATA_MIN by M times.

Additionally, when considering the hysteresis factor, the linear determined range may be (NDATA_MIN/M*(1−HYS))<NDATA<(NDATA_MAX/M*(1+HYS)), in which HYS is the hysteresis factor. In doing so, the upper value is increased with the hysteresis term HYS*NDATA_MAX/M, the lower value NDATA_MIN/M is reduced with the hysteresis term HYS*NDATA_MIN/M.

If the magnitude of the rough sensing signal is not within a predetermined range, then process the step S205. In step S205, updating the sensitivity settings and the exposure time of the light sensor when the magnitude of the sensing signal is not within the predetermined range. It is worth mentioning that the rough exposure time is also be updated when the exposure time is updated, because the rough exposure time is less than the exposure time by M times. The sensitivity settings could be updated by following manner. Reducing the sensitivity of the light sensor by one step when the magnitude of the rough sensing signal NDATA' is larger than the upper value NDATA_MAX/M. Increasing the sensitivity of the light sensor by one step when the magnitude of the rough sensing signal NDATA' is smaller than the lower value NDATA_MINIM. Or, maintaining the sensitivity of the light sensor when the magnitude of the rough sensing signal NDATA' is within the predetermined range (NDATA_MAX/M<NDATA'<NDATA_MIN/M). After step S205, processing step S201 again.

If the magnitude of the rough sensing signal NDATA' is within the predetermined range, then process the step S207. In step S207, acquiring a sensing signal NDATA (i.e. applying the actual data integration) of the light sensor with the updated sensitivity settings and the updated exposure time.

In other words, the sensor starts data integration with the rough exposure time that is M times less than the typical rate. The data output is expected to be M times smaller than a full integration output. Similarly, the predefined linear range boundary will be M times smaller. Therefore, the comparison will compare the rough data integration with both extreme linear range boundaries NDATA_MIN/M and NDATA_MAX/M. The rough data integration cycle might repeat a few times until the optimized gain settings were found. Full data integration would start with using the derived optimum gain settings. A new data integration cycle repeats again with rough data integration and with most recent derived gain settings.

Figure 8:
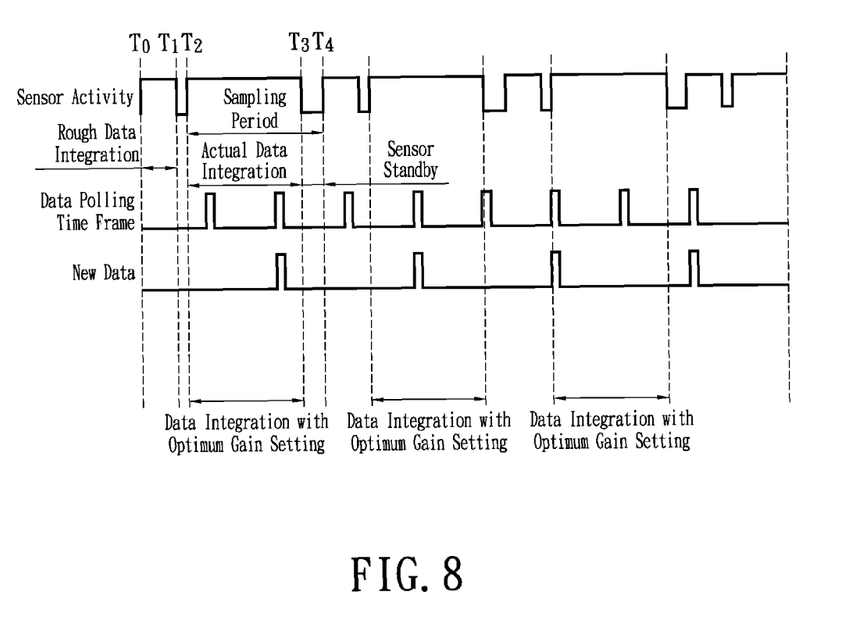
FIG. 8 shows a timing diagram of implementing rough data integration prior to actual data integration according to another embodiment of the instant disclosure.

FIG. 8 illustrates the timing diagram of implementing rough data integration prior to actual data integration. Rough data integration time (T2−T0) should be much shorter than the actual data sampling period (T4−T2) so that it would not significantly slowing down the sensor overall conversion rate (T4−T0). This implementation could also ensure every actual data integrations to use the optimum gain settings derived based on incoming ambient light level.

In summary, the aforementioned ambient light sensing method could extend the sensor dynamic range without degrading the sensor resolution, and the sensor conversion time may not be significantly increased. A rough sensing procedure could be applied to reduce the sensor conversion time. The ambient light sensor sensitivity can be adjusted according to incoming ambient light by assessing the current measurement if it is outside the sensor predetermined linear range, so that the sensor sensitivity can be adjusted accordingly for next light measurement. This auto gain control algorithm can be implemented built-in to the sensor chip or implemented at the controller level outside the sensor chip. With the described invention, the dynamic range of the sensor can be extended up to 1000× without sacrificing sensor resolution and conversion speed. Further, a force restart process could be applied to the method in order to increase the conversion speed.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An ambient light sensing method, comprising:
  acquiring the sensitivity settings, an exposure time and periodically obtaining a sensing signal of a light sensor with a sampling period according to the sensitivity settings and the exposure time, wherein the sampling period includes a data integration time and a standby time, the data integration time is the exposure time;
  determining whether the magnitude of the sensing signal is within a predetermined range when the sensing signal is available, wherein the predetermined range has an upper value and a lower value;
  updating the sensitivity settings and the exposure time of the light sensor according to the determined result for the magnitude of the sensing signal; and
  acquiring the sensing signal of the light sensor with the updated sensitivity settings and the updated exposure time.

2. The ambient light sensing method according to claim 1, wherein updating the sensitivity settings comprising:
  reducing the sensitivity of the light sensor by one step when the magnitude of the sensing signal is larger than the upper value;
  increasing the sensitivity of the light sensor by one step when the magnitude of the sensing signal is smaller than the lower value; and
  maintaining the sensitivity of the light sensor when the magnitude of the sensing signal is within the predetermined range.

3. The ambient light sensing method according to claim 1, wherein obtaining the sensing signal of the light sensor further comprising:
  performing a force restart procedure to re-obtaining the sensing signal at any time of the sampling period.

4. The ambient light sensing method according to claim 1, wherein the upper value is increased by a hysteresis term, the lower value is reduced by the hysteresis term.

5. An ambient light sensing method, comprising:
  acquiring the sensitivity settings, an exposure time and obtaining a rough sensing signal of a light sensor according to the sensitivity settings and the exposure time, wherein the rough sensing signal is acquired during a rough exposure time less than the exposure time by M times, in which M is larger than 1;
  determining whether the magnitude of the rough sensing signal is within a predetermined range when the rough sensing signal is available, wherein the predetermined range has an upper value and a lower value;

updating the sensitivity settings and the exposure time of the light sensor when the magnitude of the rough sensing signal is not within the predetermined range; and acquiring a sensing signal of the light sensor with the updated sensitivity settings and the updated exposure time when the magnitude of the rough sensing signal is within the predetermined range.

6. The ambient light sensing method according to claim 5, wherein after determining whether the magnitude of the rough sensing signal is within the predetermined range and before acquiring the sensing signal of the light sensor, further comprising:

re-obtaining the rough sensing signal of the light sensor according to the updated sensitivity settings and the updated exposure time when the sensitivity settings and the exposure time are changed;

re-determining whether the magnitude of the rough sensing signal is within a predetermined range; and re-updating the sensitivity settings and the exposure time of the light sensor according to the re-determining result for the magnitude of the rough sensing signal.

7. The ambient light sensing method according to claim 5, wherein updating the sensitivity settings comprising:

reducing the sensitivity of the light sensor by one step when the magnitude of the rough sensing signal is larger than the upper value;

increasing the sensitivity of the light sensor by one step when the magnitude of the rough sensing signal is smaller than the lower value; and maintaining the sensitivity of the light sensor when the magnitude of the rough sensing signal is within the predetermined range.

8. The ambient light sensing method according to claim 5, wherein obtaining the sensing signal of the light sensor comprising:

periodically obtaining the sensing signal with a sampling period, wherein the sampling period includes a data integration time and a standby time.

9. The ambient light sensing method according to claim 5, wherein the upper value is increased by a hysteresis term, the lower value is reduced by the hysteresis term.

10. An ambient light sensing device, comprising:

a sensor, having sensitivity settings, generating a sensing signal when illuminated by the ambient light; and a controller, acquiring the sensitivity settings, an exposure time and periodically obtaining a sensing signal of the light sensor according to the sensitivity settings and the exposure time, determining whether the magnitude of the sensing signal is within a predetermined range when the sensing signal is available, wherein the predetermined range has an upper value and a lower value, updating the sensitivity settings and the exposure time of the light sensor according to the determined result for the magnitude of the sensing signal, and acquiring the sensing signal of the light sensor with the updated sensitivity settings and the updated exposure time;

wherein the controller performs a force restart procedure to re-obtaining the sensing signal at any time of the sampling period.

11. The ambient light sensing device according to claim 10, wherein the controller reduces the sensitivity of the light sensor by one step when the magnitude of the sensing signal is larger than the upper value, increases the sensitivity of the light sensor by one step when the magnitude of the sensing signal is smaller than the lower value, and maintains the sensitivity of the light sensor when the magnitude of the sensing signal is within the predetermined range.

12. The ambient light sensing device according to claim 10, wherein the upper value is increased with a hysteresis term, the lower value is reduced with the hysteresis term.

13. An ambient light sensing device, comprising:

a sensor, having sensitivity settings, generating a sensing signal when illuminated by the ambient light; and a controller, acquiring the sensitivity settings, an exposure time and periodically obtaining a rough sensing signal of a light sensor according to the sensitivity settings and the exposure time, wherein the rough sensing signal is acquired during a rough exposure time less than the exposure time by M times, in which M is larger than 1, determining whether the magnitude of the rough sensing signal is within a predetermined range when the rough sensing signal is available, wherein the predetermined range has an upper value and a lower value, updating the sensitivity settings and the exposure time of the light sensor when the magnitude of the rough sensing signal is not within the predetermined range, and acquiring the sensing signal of the light sensor with the updated sensitivity settings and the updated exposure time when the magnitude of the rough sensing signal is within the predetermined range.

14. The ambient light sensing device according to claim 13, wherein the controller reduces the sensitivity of the light sensor by one step when the magnitude of the rough sensing signal is larger than the upper value, increases the sensitivity of the light sensor by one step when the magnitude of the rough sensing signal is smaller than the lower value, and maintains the sensitivity of the light sensor when the magnitude of the rough sensing signal is within the predetermined range.

15. The ambient light sensing device according to claim 13, wherein the upper value is increased with a hysteresis term, the lower value is reduced with the hysteresis term.

\* \* \* \* \*